UNITED STATES PATENT OFFICE.

HENRY DESBOROUGH PHILLIPS, OF INDIANAPOLIS, INDIANA.

COMPOSITION OF MATTER FOR THE MANUFACTURE OF ROAD OR STREET BRICKS.

954,694.  Specification of Letters Patent.  Patented Apr. 12, 1910.

No Drawing.  Application filed October 4, 1909.  Serial No. 520,852.

*To all whom it may concern:*

Be it known that I, HENRY D. PHILLIPS, of Indianapolis, in the county of Marion and State of Indiana, have invented certain new and useful Improvements in Composition of Matter for the Manufacture of Road or Street Bricks; and I do hereby declare the following to be a full, clear, and exact description of the invention, such as will enable others skilled in the art to which it appertains to make and use the same.

My invention relates to improved composition of matter for the manufacture of road or street bricks, the object being to produce a brick possessing great hardness and which will be capable of resisting dampness.

This composition consists of the following ingredients, combined in substantially the following proportions, viz:

| | |
|---|---|
| Portland cement | 100 pounds. |
| Sand | 4 times the bulk of the cement. |
| Arsenious acid (pulverized) | 10 pounds. |
| Mica crystals (mesh No. 60) | 6 pounds. |
| Blue vitriol (pulverized) | 3 pounds. |
| Sulfur (pulverized) | 1 pound. |

The process of manufacture is as follows: The cement and chemicals are mixed in the dry state, and after they have been thoroughly commingled, the sand is added and the batch thoroughly mixed. After the dry mixing the necessary amount of water is added and the entire mass thoroughly agitated and again mixed. From this compound the bricks are pressed or molded into proper form, placed on cars and permitted to dry in the open air for about five (5) hours more or less and finally the cars are run into cylinders where the bricks are subjected to the action of steam for about twenty-four (24) hours more or less.

In the manufacture of bricks for the purpose stated, the use of the ingredients in substantially the proportions above specified, is essentially important.

Having fully described my invention what I claim as new and desire to secure by Letters-Patent, is—

The herein described composition of matter for making road or street bricks, consisting of cement, sand, arsenious acid, mica crystals, blue vitriol and sulfur, in substantially the proportions specified.

In testimony whereof, I have signed this specification in the presence of two subscribing witnesses.

HENRY DESBOROUGH PHILLIPS.

Witnesses:
LEANDER L. LOUIS,
HALLIE G. SIEHR.